Oct. 18, 1932.  E. GRANAT  1,883,711
VARIABLE SPEED TRANSMITTER FOR DISTANT CONTROL DEVICES
Filed Aug. 26, 1927  3 Sheets-Sheet 1
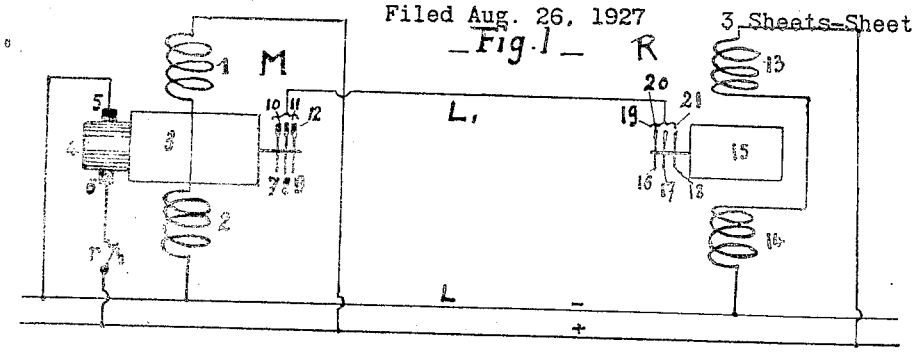
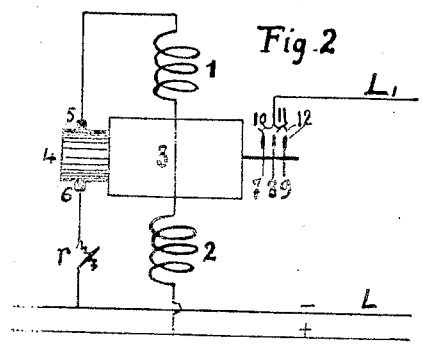
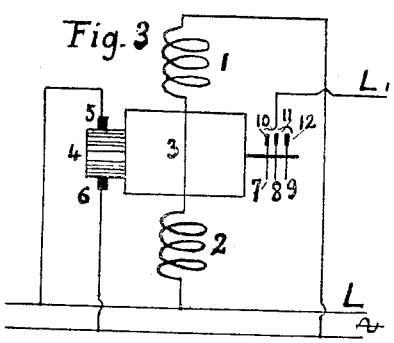
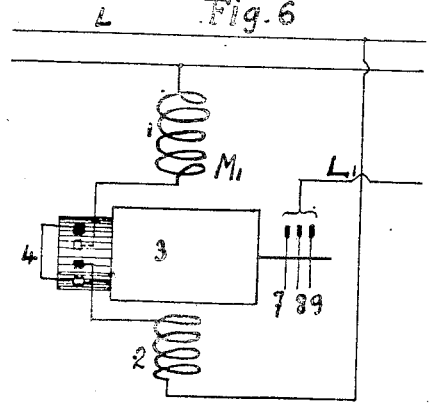
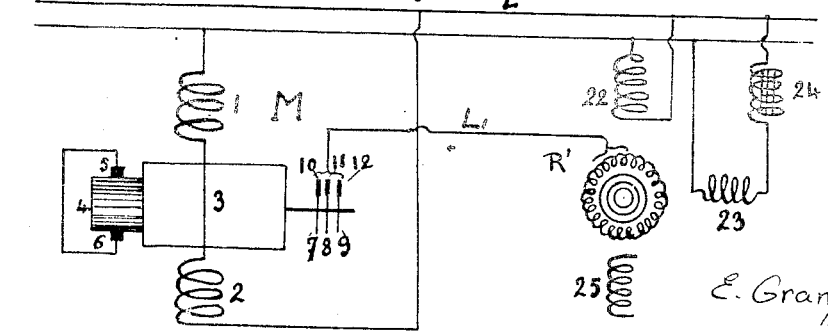
E. Granat
INVENTOR
By: Marker & Clark
Attys.

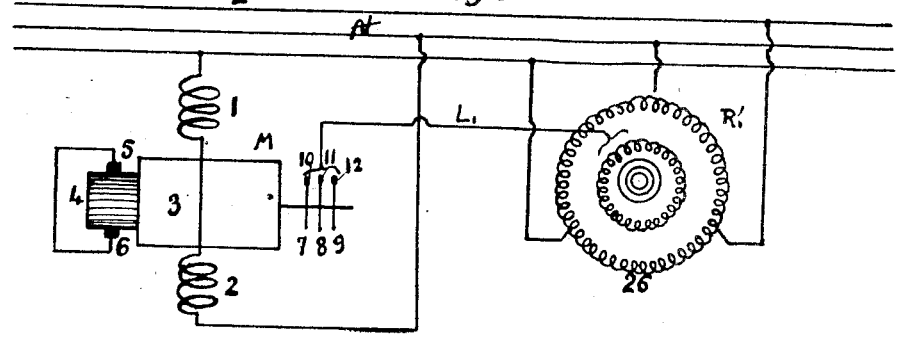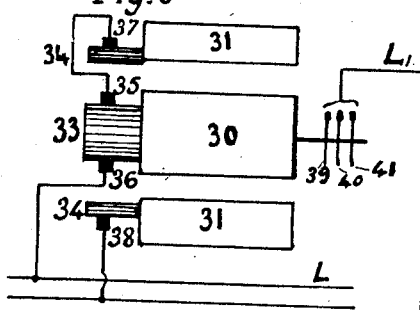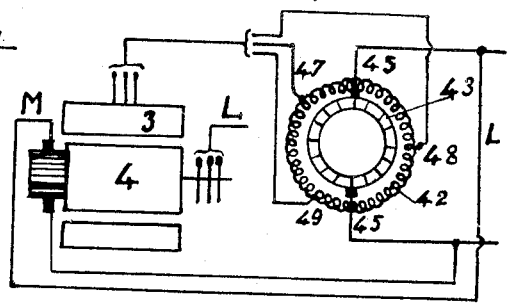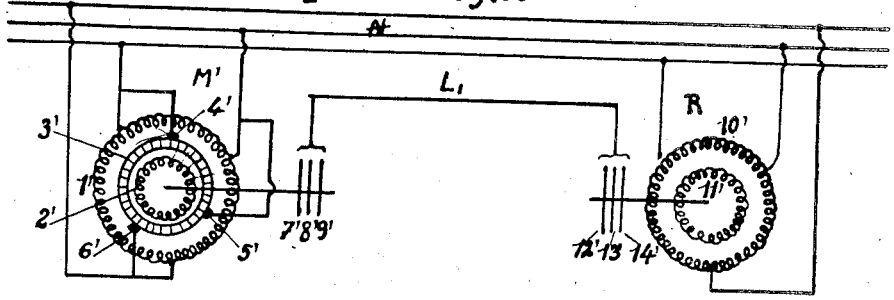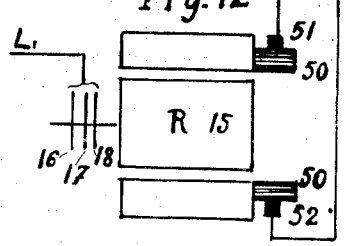

Oct. 18, 1932.  E. GRANAT  1,883,711
VARIABLE SPEED TRANSMITTER FOR DISTANT CONTROL DEVICES
Filed Aug. 26, 1927   3 Sheets-Sheet 3
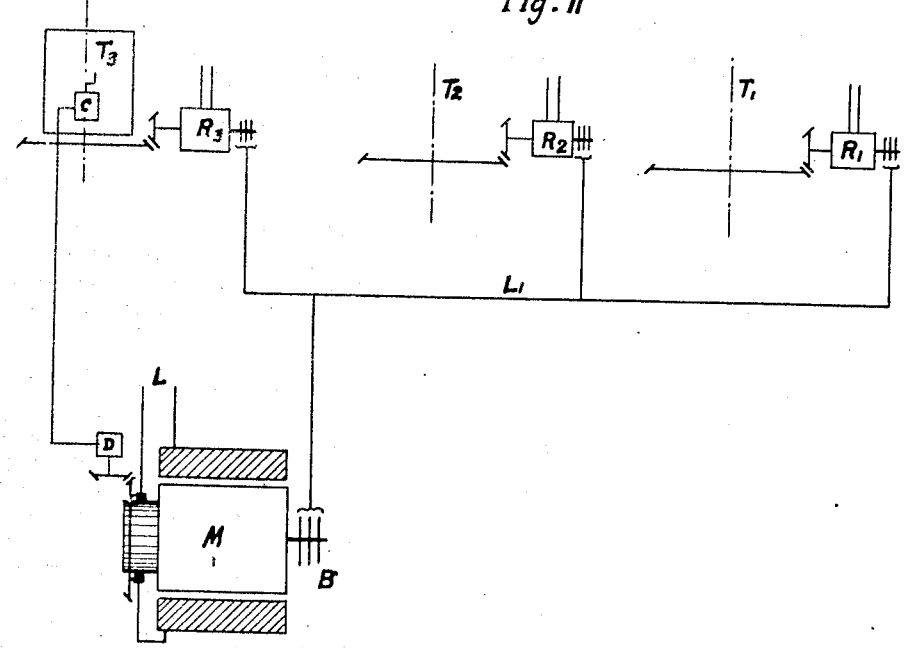
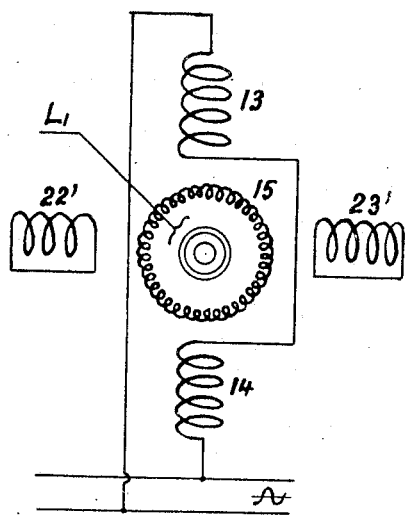

Patented Oct. 18, 1932

1,883,711

UNITED STATES PATENT OFFICE

ELIE GRANAT, OF PARIS, FRANCE, ASSIGNOR OF ONE-HALF TO COMPAGNIE DES FORGES ET ACIERIES DE LA MARINE ET D'HOMECOURT, OF PARIS, FRANCE, A COMPANY OF FRANCE

VARIABLE SPEED TRANSMITTER FOR DISTANT CONTROL DEVICES

Application filed August 26, 1927, Serial No. 215,704, and in France March 19, 1927.

The present invention has for its object a variable speed auxiliary motor adapted to serve as a distant control transmitter whilst simultaneously driving directly a part of any description. This motor shall be hereinafter termed auxiliary motor because it often acts only as speed regulator and not as a motor producing directly useful work. A machine is constituted by two parts, a rotor and a stator which shall be hereinafter termed the components of said machine. This auxiliary motor which may be of any type for direct one-phase or polyphase current with a shunt, series or short circuited rotor is characterized by the fact that the adjustment of its speed between its stopping and the maximum speed allowed is provided by the relative displacement or phase shifting of the stator and rotor fields, which causes in the receivers, of which one component is fed with the synchronizing current collected at stationary points of the winding of the auxiliary motor, the field of which is acted upon, a similar displacement or phase-shifting of the fields; thanks to this displacement or phase-shifting the speed of the said receivers remains in a constant ratio with that of the auxiliary motor at the moment considered. The other component of the receivers is preferably fed with the same current as the auxiliary motor so that the phase relationships in the auxiliary motor and for the receivers are always similar.

In the case of a shunt or series auxiliary motor fed with direct or alternating one-phase current, the relative displacement of the two fields normally stationary in space of the stator or of the rotor of the auxiliary motor is obtained by modifying the feeding phase of one of these components or by moving the movable feed brushes thereof. This has at the same time as a result a modification in the speed of the auxiliary motor which controls the distant control receivers; the latter wherein the fields move under the action of the phase modifications of the current feeding one of their components, rotate consequently at a speed corresponding to these modifications, which speed remains therefore in a constant ratio with that of the auxiliary motor. The phase modification in the auxiliary motor may be provided in this case, for instance, by collecting the feed current on a distributor constituted by a static winding fed with one-phase current.

In the case of auxiliary motors constituted by a repulsion motor, compensated or not, it is known that the speed of the said auxiliary motor may be adjusted by moving the short circuited brushes of the rotor which feeds the distant control wires. An accurate control is thus provided for the distant control receivers constituted by two components of which one, the rotor as a rule, receives the distant control current, by making the field of the other component rotate at the same speed as the resulting rotating field of the auxiliary motor. The rotors of the auxiliary motor and of the receivers are thus placed in the same phase conditions in similar rotating fields and rotate thereby at the same speed. This result is obtained by producing two fields at right angle with each other in time and in space in the windings of the receivers which are not fed by the distant control or else by feeding the said windings from the same polyphase wires of which two wires feed also the auxiliary motor.

In the case of auxiliary motors constituted by a polyphase motor, the phase shifting of the fields is varied by modifying the position of the movable brushes feeding one of the components which feeds in its turn through a certain number of stationary points the distant control wires. The result is a phase shifting between the components of the receiver fed respectively through the polyphase wires and the distant control wires. The similar phase-shifting of the fields in the transmitter and the receivers causes the same speed modification in all the machines.

In the case of a distant control of a number of devices requiring a high total power, the above described arrangements may be used to advantage in the following manner: The auxiliary motor will be placed outside the transmitting station and controlled from this station through a small power distant control transmission or through any other distant control system. The whole transmitter station and receiving station or stations will be controlled by the movement of the auxiliary motor and thereby the movements of all the devices will be synchronous. In all cases it is of interest to note that the feeding phase of one of the components of any receiver may be modified for instance by moving the set of feed brushes of the said component. Thus the movement of the receiver considered may be corrected locally.

In the cases considered hereinabove wherein the resultant alternating flux has a direction substantially stationary in space, the working of the arrangement may be improved by adding to the receiver or the transmitter or to both together windings adapted to create compensating fluxes, these windings being short-circuited and disposed so as to make the currents arising therein produce a flux at 90 electrical degrees with the main flux and the action of which causes the shifting of the components of the machine to decrease.

By way of example and by no means as a limitation there is described hereinbelow and shown on appended drawings several forms of execution of the auxiliary motor acting as a transmitter and of a corresponding receiver for different kinds of feed current as well as an application to the distant control of a series of devices requiring a high total power.

Fig. 1 illustrates a D. C. distant control device, the auxiliary motor working as a shunt motor.

Fig. 2 illustrates the same device with an auxiliary series motor.

Figs. 3 and 4 show a similar device with a one-phase A. C. feed; the transmitting auxiliary motor being a shunt motor in the case of Fig. 3, a series motor in the case of Fig. 4.

Figs. 5 and 6 show two arrangements wherein the transmitter and receiver being both fed with one phase-current, the auxiliary motor rotates respectively as a repulsion motor or as a compensated repulsion motor, the receiver being provided in both cases with a special winding.

Fig. 7 shows a device using the same transmitter as in Fig. 5 but wherein the rotating field of the receiver is created by a three-phase current having the same frequency as the one-phase current feeding the transmitter.

Fig. 8 shows a modified form of the transmitter of Fig. 2 provided with two commutators, the movable brushes being on the stator, those of the rotor remaining stationary.

Fig. 9 shows a modified form according to which the shifting of the stator field of the transmitter is produced electrically from a distance.

Fig. 10 shows an arrangement of an auxiliary motor fed with three-phase current together with the corresponding receiver.

Fig. 11 shows an application of a series or shunt auxiliary motor to the distant control of several devices requiring a high total power, the auxiliary motor being controlled from the transmitting station through a control transmission of small power.

Fig. 12 shows a controlled receiver the stator of which is provided with a commutator allowing local corrections to be brought to the rotations transmitted by the auxiliary motor or to allow an initial setting of the said receiver to be made.

Fig. 13 shows a controlled receiver similar to that of Fig. 1 fed with A. C. for instance and provided with a winding producing a compensating flux.

The arrangement of the controlling auxiliary motor and of a receiver shown on Fig. 1 comprises:

(a) A controlling auxiliary motor M constituted by a stator with projecting poles 1 and 2 (or with a distributed winding) which is fed through the D. C. wires L and by a wire wound rotor 3 provided with a commutator 4 on which two movable brushes 5 and 6 connected with the wires L are adapted to rub; the rotor is provided also with three rings 7, 8, 9 connected with the wires $L_1$ through the three brushes 10, 11, 12.

(b) A controlled receiver R constituted by a stator with projecting poles 13 and 14 (or with a distributed winding) fed through the same D. C. wires L and by a wire wound rotor 15 with rings 16, 17, 18 connected with three stationary points of the winding, the current of the wires $L_1$ being brought to these rings through the brushes 19, 20, 21.

The working of the arrangement is the following:

When the movable feed brushes 5, 6 are disposed in the plane perpendicular to the neutral line, the current in the armature which it is necessary to limit to a proper value through a suitable resistance $r$ varying with the shifting of the brushes, produces a field coinciding with that of the stator: there is thus no torque created and the rotor remains stationary.

When the brushes are moved, the angle between the stator and rotor fields increases and so does the torque. For a certain value of this angle, the rotor starts and rotates like in a shunt motor at a speed depending on the angle between the fields. By shifting the brushes by 90 electrical degrees up to the neutral line the speed increases up to a maximum. If instead of the brushes moving in one direction, they were to be moved in the opposite direction, the same phenomena would be produced again, the torque and the speed would be reversed.

The direction of the resulting field remains substantially the same as that of the field piece and in any case cannot move by more than 90 electrical degrees on either side thereof whereby the rotating rotor may be considered as moving in a field substantially stationary in space.

The current collected by the three rings 7, 8, 9 is evidently a three-phase current the variable frequency of which is precisely the frequency of rotation of the rotor.

This controlling auxiliary motor acts, in a word, like an inverted commutating machine the frequency of which varies with the movement of the brushes.

As soon as the motor M rotates, a three-phase current the frequency of which is determined by the speed of the auxiliary motor rotor flows through the receiver rotor. A rotating field of same frequency passes through the receiver rotor. This rotor starting from speed zero like the rotating field, starts in synchronism therewith. Thereby if the resisting torque does not pass beyond a given value, the receiver R acts as an auto-synchronous motor and remains in synchronism.

The transmitting auxiliary motor rotating at a speed varying with the displacement of the brushes is thus adapted whilst providing a certain useful torque on its shaft to control one or more receiving motors.

In the case where the transmitter were to feed momentarily no receiver or part only of the receivers, a different position of the brushes would be necessary for the same speed, according to the load; but for a given load the speed would vary nevertheless in a continuous manner when the brushes move.

Fig. 2 shows an auxiliary motor of the same type but working as a series motor, the receiving motor being the same as that on Fig. 1. As in the case of Fig. 1 the resulting field is a field stationary in space and the manner of working is the same as that which has just been disclosed.

Fig. 3 shows an auxiliary motor identical with that of Fig. 1 but fed with one-phase current.

The receiver is also identical with that of Fig. 1 but its stator is fed with one-phase A. C.

The working of the device is similar to that disclosed hereinabove.

The reason is that when the movable feeding brushes 5 and 6 are set in the plane perpendicular to the neutral line, the current in the armature being limited to a suitable value by the reactance of the armature, produces an alternating field stationary in space and coinciding with the stationary alternating field of the stator. No torque is thus produced and the rotor remains stationary.

The displacement of the brushes in one direction or the other shifts these two fields and a torque appears which causes the rotor to rotate. The direction of this rotation is determined by that of the movement of the brushes, the speed depending on the shifting angle for a given load.

The maximum angle of displacement of the brushes is by 90 electrical degrees in each direction.

On the other hand the two alternating fields of the auxiliary motor rotor and stator which are in phase produce an also alternating resultant field of same frequency and in phase therewith. This resultant field remains substantially stationary in space and in all cases the maximum angle it makes with the inducing field is always below the corresponding angle by which the brushes are shifted. Therefore, the rotor of the transmitter may still be considered as an armature rotating in an alternating field stationary in space. The receiver having its stator fed from the same supply of one-phase A. C. shows therefore an inducing field also alternating and stationary in space.

When the motor begins rotating by reason of the shifting of the brushes, the alternating field of the rotor 15 of the receiver due to the currents circulating in the wires, rotates at the same speed as the transmitter rotor.

As the speed is being given to the parts, a torque has a tendency to bring constantly the rotating field of the receiver rotor in the direction of the stator field. If the resisting torque is below a given value, the result for a sufficient driving torque and a given position of the brushes is a rotation of the receiver at a speed synchronous with that of the auxiliary motor M as the phase shifting of the field of the rotor receiver fed through the rotating brushes always corresponds to the phase shifting of the field of the transmitter rotor determined by the phase-shifting of the said brushes.

Fig. 4 shows an auxiliary motor fed like in Fig. 3 with one phase A. C., but working as a series motor.

Like in the preceding case the resulting field is stationary in space; thereby the working is the same as that which has just been disclosed.

Fig. 5 shows an auxiliary motor working as a repulsion motor. The auxiliary motor M working as transmitter comprises the same parts as the motors of the above-mentioned types. The stator is fed with one-phase current. The brushes 5 and 6 are short-circuited and may move over the commutator 4.

The known theory of repulsion motors shows the speed varies according to the shifting of the brushes and the reversal of the movement is obtained when the brushes pass over the line connecting the poles.

It is also known that the superposition of the rotor and stator fields which are at 90° from each other in time and in space and have unequal maximum values, gives an elliptic resultant rotating field the frequency of which is moreover equal to that of the mains.

In order that the distant control device may work like in the precedent cases it is necessary that the receiver should have a stator field rotating at the same frequency so that it is placed in the same kind of field arrangement as the transmitter.

The receiver R' of Fig. 5 provides for this condition. Its rotor is the same as that of the precedent receivers and its stator bears two windings 22 and 23 at 90° from each other in time and in space, the shifting as to time being provided through an induction coil 24.

Each of the windings 22 and 23 is fed through a shunt of the one-phase wires.

An inducing field rotating at the frequency of the mains is thus obtained.

This brings back evidently to the case of Fig. 1 as it is sufficient to imagine the rotating fields of the stators of the transmitter and receiver are stationary, the two machines being supposed to be driven together mechanically in the opposite direction at the same speed.

The resultant field being then an alternating field having a stationary direction in space, the precedent theory may be applied.

A difference lies however in the fact that for a given speed of the whole, the torque of the receiver, for a given shifting of its rotor with reference to its initial position is pulsatory by reason of the elliptic shape of the resultant field of the transmitter.

Moreover the reversal of the movement is not obtained when the brushes pass over the line connecting the poles because the rotating field is reversed only at the transmitter. The reversal of the movement will be obtained for instance by reversing the direction of rotation of the rotating field of the receiver. For instance the receiver might be provided with a second winding 25 identical to 22 but at 180 electrical degrees with reference thereto. One of these two windings would be used according to the direction of movement.

Fig. 7 shows another form of execution of the rotating field of the receiver $R'_1$ based on the use of a stator with a distributed winding 26 fed with three-phase current.

In this case the one-phase feeding current of the auxiliary motor M will be taken from two phases of the three-phase wires. The torque is again pulsatory as in the precedent case and for the same reason.

An auxiliary motor M may also be imagined (Fig. 6) with four brush arrangements at 90° from each other, two of them being in series with the stator and the two others short circuited. The whole being fed with one-phase current, a compensated repulsion motor is thus produced. The three rings 7, 8, 9 would allow the control of the receivers $R'_1$ or $R'_1$ because the resultant field in this type being similar to that of the repulsion motor, all that has been disclosed with reference to the latter motor may be applied entirely to the compensated motor.

Fig. 8 shows a particular device applicable to transmitting auxiliary motors of the above type. The figure shows by way of example a series transmitter.

The stator having a distributed winding 31 bears a commutator 34 on which rubs a set of two movable brushes 37 and 38.

The rotor 30 is provided also with a commutator 33 on which two stationary brushes 35 and 36 are adapted to rub. The rings 39, 40, 41 are connected with three equidistant points of the winding of the rotor and serve as in the preceding case for feeding the distant control. The shifting of the rotor and stator fields is obtained by the movement of the brushes 37, 38 over the stationary commutator 34. The adjustment of the speed and the reversal of the movement are therefore provided by the brushes 37, 38, the brushes 35, 36, suitably set, remain stationary.

This arrangement may be of interest when the part controlling the starting has a very small torque because, the commutator 34 being stationary, the rubbing torque of the brushes is reduced to some considerable extent.

Figure 9 shows a modified form of the invention wherein the shifting of the field of the stator 3 is obtained electrically through a static transmitter.

This transmitter may be constituted for instance by an auto-transformer 42 including a continuous distributed winding provided with a commutator 43 on which rub two brushes 45 and 46 connected with the one-phase current supply which feeds also the rotor 4 of the auxiliary motor; three stationary points 47, 48, 49 of the winding 42 are connected with three stationary points of the stator 3 of the auxiliary motor.

The rotation of the brushes 45, 46 produces a phase-shifting of the feeding current of the stator 3 and causes thus the rotor 4 to start in the same manner as through the mechanical displacement of the movable brushes in the precedent examples.

Figure 10 illustrates a transmitting auxiliary motor and a controlled receiver fed with polyphase current (three-phase in the example shown). This device comprises:

(a) A transmitting auxiliary motor M' constituted by a stator 1' with a distributed winding fed through three points by the mains L and a rotor 2' provided with a commutator 3' on which rub three movable brushes 4', 5', 6' also connected with the mains L; three rings 7', 8', 9' also connected with three stationary points of the winding serve as starting points for the distant control wires $L_1$.

(b) A receiving motor R constituted by a stator 10' with a distributed winding fed through three points by the line L and by a rotor 11' provided with three rings 12', 13', 14' fed with the wires $L_1$.

The working of the device is the following:

The stator and the rotor of the transmitter fed with the three-phase current of the wires L create each a rotating field.

The shifting of these two fields with reference to each other is constant and depends on the position of the movable brushes 4', 5', 6'. Thereby the transmitter rotor is driven at a given speed. If the brushes are moved on the commutator, this speed may be varied from a maximum to zero. When the zone corresponding to zero is passed, the relative position of the rotating fields of the stator and rotor is modified and the current changes direction together with the movement of rotation. However, the resulting flux rotates always in the same direction with the frequency of the mains.

This auxiliary motor has thus a variable speed and a reversal of movement through the shifting of the brushes.

The resultant field of the transmitter being a rotating field the inducing field of the receiver R being also a rotating field of the same frequency, the induced field is phase-shifted with reference to the inducing field by a constant amount determined by the shifting of the transmitter brushes; thereby the receiver rotates at the same speed as the transmitter (or at a speed proportional if the number of poles is greater). This case may be compared to that of Fig. 1 if it is imagined that the whole transmitter and receiver are driven in a direction opposite to the rotating field. The fields considered become then stationary, which explains that the receiver R is then controlled by the movement of the rotor of the transmitter M.

Fig. 11 shows an application of the present transmitting system to the control of a certain number of devices and of the transmitting station, the whole requiring considerable power from the transmitter motor. M is the motor of the distant control of one of the types precedently described having a reversal of motion; it may be placed at any place.

The rings B are connected by the line $L_1$ with the receivers R, $R_2$, $R_3$ which control respectively the controlled devices $T_1$, $T_2$ and the controlling station $T_3$. The auxiliary motor and the receivers may be fed with any current as disclosed hereinabove.

The control of the brushes of the auxiliary motor M is effected from the controlling station through a control transmission of small power, C being the transmitter, D the receiver coupled with the brushes of the auxiliary motor M (in the case it is desired to shift the said brushes).

The control by a part requiring little power (transmitter C) allows thus the simultaneous control of the controlled parts and the synchronous driving of the controlling station.

Evidently instead of shifting the brushes, the feeding phase of one of the components of the auxiliary motor may be acted upon electrically.

It is moreover possible to add in the receiver several movements by providing the receiver stator with a distributed winding provided with a commutator 50 as shown on Fig. 12, this possibility of correcting being moreover applicable to most of the distant control devices described hereinabove. The movement of the brushes 51–52 on this commutator which produces the desired correction may be obtained from a distance by a distant control device of small power for instance of one of the types described or recalled in the present application.

The application shown on Fig. 11 and comprising or not the device of Fig. 12 is of particular interest in the case where the controlling station must be light so as to remain movable, the control being made from this transmitting station, without its comprising any heavy part, the auxiliary motor M being adapted to be placed in any more suitable place.

Fig. 13 illustrates a controlled receiver with two poles provided with a compensating winding constituted by the coils 22' and 23' short circuited on themselves. The coils 13 and 14 are the inducing coils similar to those of the receiver R on Figure 1. The axes of these coils are at 90 degrees from those of the compensating coils.

The working with one-phase A. C. for instance is the following:

When the receiver rotates in synchronism with the transmitter, the rotor field has substantially the same direction as the main inducing field.

Consequently neither of these fields has any action on the compensation coils 22' and 23' the axes of which are perpendicular to that of the field considered.

If the rotor 15 has a tendency to be shifted, the angle made by the rotor field with the axis of the compensating coils has a tendency to diminish and at this moment, the coils 22' and 23' are the seat of an induced current producing an alternating field the direction of which is perpendicular to that of the main field and which by virtue of the law of Lenz has a tendency to bring the main flux and that of the rotor in neighbouring directions.

This system of compensation may be used whatever the number of poles of the apparatus.

The coils 22' and 23' may also be disposed at the transmitter but in this case the effect of the compensating windings would be that when the receiver has a tendency to move too slowly there would be a real reaction of the two rotors one on the other and the transmitter would also have a tendency to have its speed reduced.

What I claim is:

A transmitter-repeater system comprising a transmitter constituted by a rotor and a stator, a stationary commutator electrically connected with one of the transmitter elements, polyphase slip-rings connected with equidistant tappings of the transmitter rotor, receivers constituted by a rotor and a stator, polyphase slip-rings connected with equidistant tappings of the corresponding receiver rotor, polyphase wires connecting the sliprings of the transmitter with the corresponding sliprings of the different receivers, alternating current mains feeding the transmitter rotor and the receiver stators, a winding inductively connected with the stationary commutator and feeding the transmitter stator, brushes rubbing on the stationary commutator and connected with the mains and means for angularly shifting the brushes and therewith modifying the relative angular setting of the stator and rotor fields of the transmitter.

In testimony whereof I have signed my name to this specification.

ELIE GRANAT.